(12) United States Patent  
Melling

(10) Patent No.: US 6,708,853 B1
(45) Date of Patent: Mar. 23, 2004

(54) MANUAL COOKIE PRESS

(75) Inventor: Hugh Melling, Harbor Springs, MI (US)

(73) Assignee: Wilton Industries, Inc., Woodridge, IL (US)

(*) Notice: Subject to any disclaimer, the term of this patent is extended or adjusted under 35 U.S.C. 154(b) by 0 days.

(21) Appl. No.: 10/435,763

(22) Filed: May 12, 2003

(51) Int. Cl.⁷ .................................................. B67D 5/42
(52) U.S. Cl. ..................................................... 222/391
(58) Field of Search ........................................ 222/391

(56) References Cited

U.S. PATENT DOCUMENTS

| | | | |
|---|---|---|---|
| 972,793 A | 10/1910 | Allred | |
| 2,634,692 A | 4/1953 | Sherbondy | |
| 2,784,603 A | * 3/1957 | Collins | ........................ 222/391 |
| 3,262,404 A | 7/1966 | Morz et al. | |
| 3,685,936 A | 8/1972 | Meth et al. | |
| 4,083,666 A | 4/1978 | Richardson | |
| 4,456,450 A | 6/1984 | Heling | |
| 4,496,510 A | 1/1985 | Hanson et al. | |
| 4,966,537 A | 10/1990 | Bowles et al. | |
| D363,405 S | 10/1995 | Elliott, Sr. | |
| D369,283 S | 4/1996 | Finlay | |
| 5,558,892 A | 9/1996 | Pelka et al. | |
| 5,650,180 A | 7/1997 | Kumada et al. | |
| 6,026,985 A | 2/2000 | Elliott, Sr. | |
| 6,054,157 A | 4/2000 | Shapiro et al. | |
| D429,451 S | 8/2000 | Taylor | |
| 6,260,737 B1 | 7/2001 | Gruendeman | |
| 6,264,071 B1 | * 7/2001 | Dentler | ........................ 222/391 |
| 6,286,729 B1 | * 9/2001 | Lin | ............................. 222/391 |
| D453,451 S | 2/2002 | Yu | |

\* cited by examiner

Primary Examiner—Philippe Derakshani
(74) Attorney, Agent, or Firm—Piper Rudnick LLP

(57) ABSTRACT

An apparatus that dispenses a food substance having a housing, a barrel connected to the housing and a lever pivotally attached to the housing. The barrel receives and stores the food substance to be dispensed. A rod having teeth thereon is connected to a plunger that is slidably positioned within the barrel. An advancing mechanism is movably positioned within the housing. The advancing mechanism includes an escapement body, a driver and a spring that engages the driver. The driver engages the teeth on the rod to advance the plunger to dispense the food substance is forced out of the barrel.

18 Claims, 5 Drawing Sheets

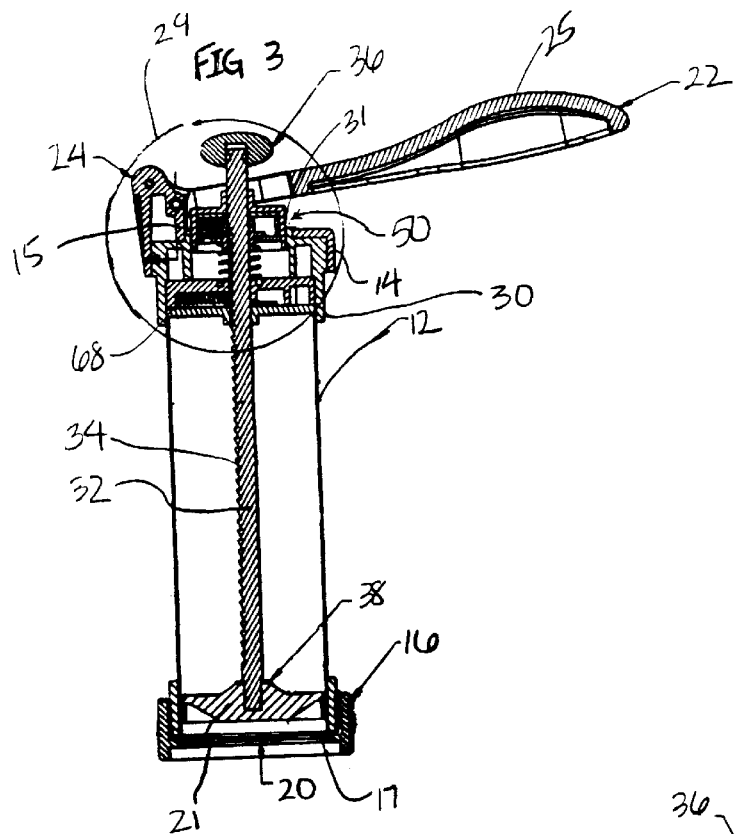
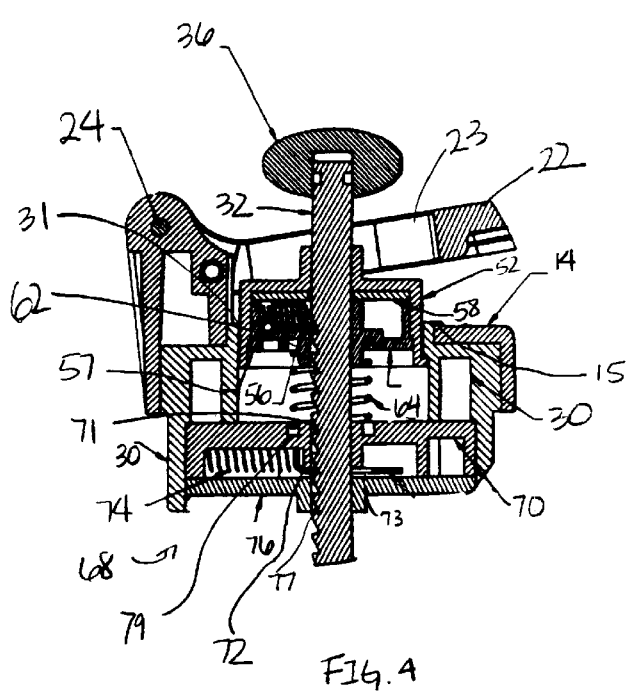

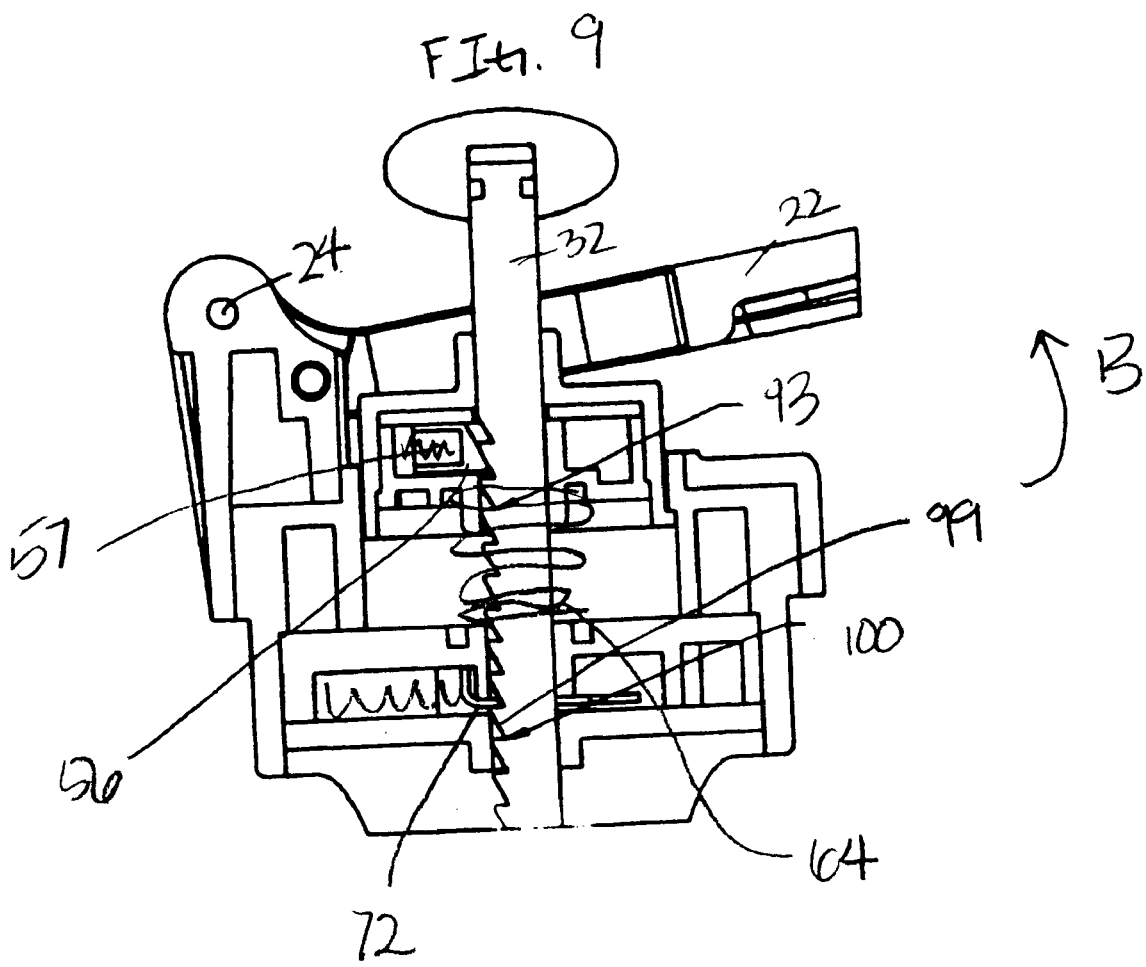

MANUAL COOKIE PRESS

TECHNICAL FIELD OF THE INVENTION

The present invention relates in general to devices for dispensing food items and, more particularly, to a hand held manual cookie press.

BACKGROUND OF THE INVENTION

Manual hand held extruding devices that dispense food items such as pasta or cookie dough are known in the art. The prior art extruding devices typically include a lever or handle that is used to advance a piston via a pawl or other latching piece that engages the teeth of a rod that is connected to the piston. Prior art extruding devices also typically use a spring to bias the latching piece towards engagement with the teeth on the rod.

As an example of such a device,. U.S. Pat. No. 4,456,450 to Heling illustrates a manual extruder having a cylinder with a movable piston rod disposed therein. The piston rod includes teeth positioned along opposing sides of the piston rod. An operating lever has two prongs that are positioned at the top of the cylinder. Each prong includes a pivot pin and a pawl which rotates about the pivot pin. The pawls contact the teeth on the piston rod. As the lever is depressed, the pawls engage the teeth on the piston rod to move the piston rod in a downward direction. As the lever is raised, the pawls engage the next highest tooth to enable the piston rod to advance during the downswing of the lever. This allows the piston rod to push the food substance out of the cylinder.

Another prior art device that uses a lever and pawls to advance a piston rod is illustrated in U.S. Pat. No. 972,793 issued to Allred. The Allred patent illustrates a mortar feeding device with a cylindrical body, two hand levers and a piston attached to a rod. The first hand lever is stationary with regard to the cylindrical body. A sleeve featuring external teeth covers and receives the rod. The device also includes two pivotally mounted pawls. The pawls are held in engagement with the teeth of the sleeve by springs. To discharge a substance from the cylinder, the second lever is raised so that the second pawl engages the next highest tooth on the sleeve. The sleeve is held stationary by the first pawl of the first lever as the second lever is raised. As the second lever is moved downward (towards the first lever), the sleeve is moved downwards which advances the piston downwards. As the sleeve moves downwards, the spring of the first pawl is compressed as the first pawl travels over a tooth of the sleeve. As such, while the second pawl is used to push the rod down, the first pawl serves as a lockout to restrain the rod from upward travel when the second lever is raised. The substance in the cylinder is forced out the bottom of the body when the second lever is pressed down.

Another prior art extruder that uses a lever and pawl to advance a piston is illustrated in U.S. Pat. No. 3,685,936 issued to Meth et al. The Meth patent illustrates a toy extruder that molds an object from a soft material. The device includes a body having a chamber therein with a movable piston positioned within the chamber and a handle pivotally connected to the body. One end of a spring is attached to a transverse pin in the piston and the second end of the spring is attached to the base of the housing. The piston includes teeth positioned along the outside surface. When the handle pivots in a clockwise direction, a pawl on the handle engages the teeth and imparts an upward movement to the piston. As a result, the piston moves upwardly within the chamber thereby pushing material out of the top of the chamber into a mold to form a toy.

The advancing mechanisms of the above prior art extruding devices require complex moving elements to properly advance the piston and the attached rod. Also, the prior art extruders are often difficult to refill with the material that is to be extruded.

Therefore, it is an object of the present invention to provide a manual hand held device for extruding a food item that is easy to use.

It is another object of the invention to provide a manual hand held device with a simplified advancing mechanism that advances a plunger to push the food item out of the device.

It is another object of the invention to provide a manual hand held device for extruding a food item that is compact and easy to store.

SUMMARY OF THE INVENTION

The present invention is directed to an apparatus for dispensing a food substance, such as cookie dough. The apparatus is formed from a housing and a barrel connected to the housing. The barrel receives and stores the food substance. A plunger is slidably positioned within the barrel and a rod having teeth thereon is connected to the plunger. The apparatus also includes an advancing mechanism having an escapement body, a driver positioned within the escapement body and a spring that engages the driver and escapement body. The apparatus also includes a lever pivotally attached to the housing. The lever engages the advancing mechanism such that when the lever is depressed, the plunger advances to depress the food substance from the barrel.

BRIEF DESCRIPTION OF THE DRAWINGS

Further aspects of the invention and their advantages may be discerned from the following description when taken in conjunction with the drawings, in which like characters number like parts and in which:

FIG. 3 is a cross sectional view of the manual cookie press illustrated in FIG. 2 taken along line 3—3 and with the disc tube removed;

FIG. 4 is an enlarged view of the advancing mechanism of the manual cookie press of FIG. 3;

FIG. 9 is a cross sectional view of the manual cookie press of FIG. 7 where the lever is fully lifted and the driver has moved up one tooth on the rod.

DETAILED DESCRIPTION

Figure 1:
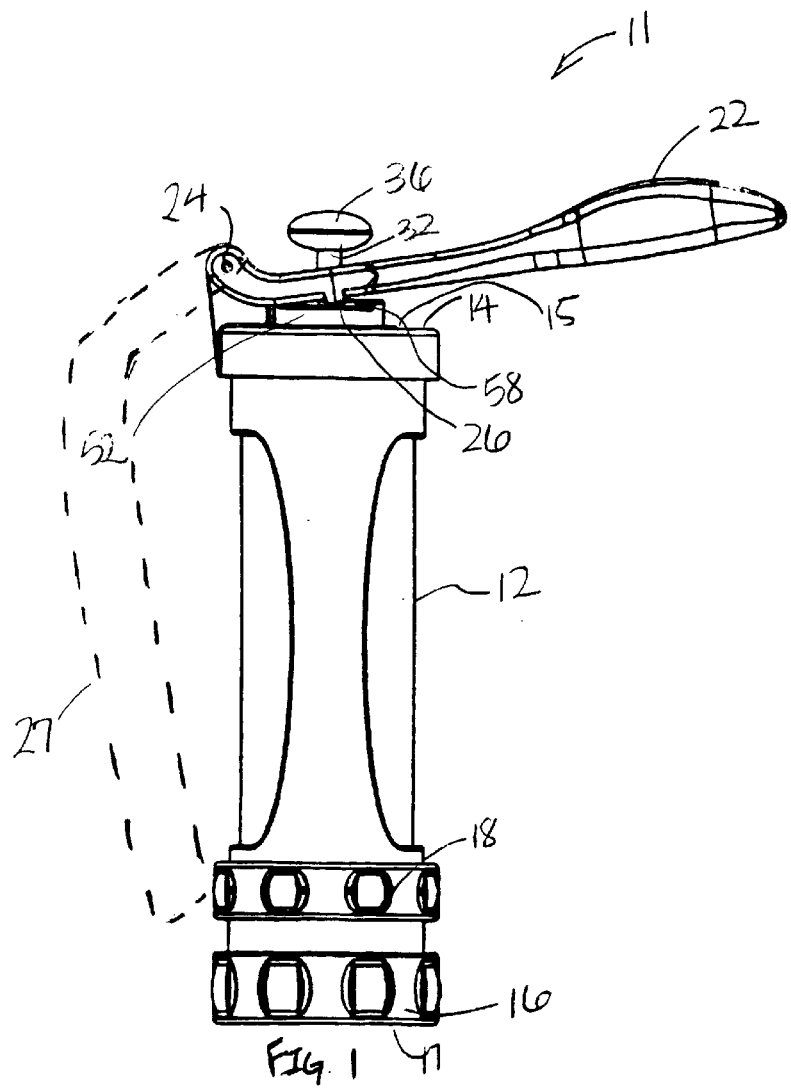
FIG. 1 is a side elevational view of the manual cookie press of the present invention.
Figure 2:
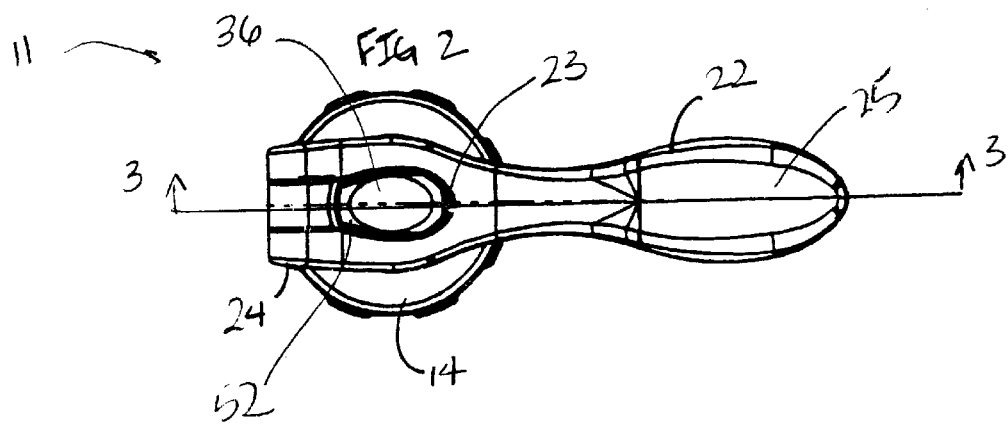
FIG. 2 is a top plan view of the manual cookie press illustrated in FIG. 1.

An embodiment of the manual cookie press of the present invention is indicated in general at 11 in FIGS. 1 and 2. The manual cookie press includes a cookie barrel 12 and a top cap 14 with an opening 15 therethrough. A moving lever 22 is pivotally connected to the top cap 14 via hinge 24. A disc tube 18 is positioned over the bottom end of the cookie barrel. The disc tube is used for temporary storage of the various discs 20 that form the cookies. The disc tube and the various discs are removed from the cookie barrel before it is used to form cookies.

As illustrated in FIG. 3, a disc 20 is positioned at the bottom of the cookie barrel. The disc 20 includes openings 21 arranged in a variety of patterns to form a template for dispensing cookie dough. A bottom cap 16 with an opening 17 therethrough secures the disc 20 to the bottom of the cookie barrel. As will be explained below, cookie dough is dispensed through the openings 21 of the disc 20 when the lever 22 of FIGS. 1 and 2 is manipulated.

As illustrated in FIG. 2, one end of the lever 22 of the cookie press includes a handle 25 which is easy for the consumer to depress and comfortable for the consumer to hold. The opposite end of the lever includes an oblong shaped opening 23 extending through the lever 22. A knob 36 is attached to the top end of the rod 32 (FIG. 1). The opening 23 is sized so that the lever 22 may be pivoted over the knob 36 from the use position illustrated in FIG. 1 to a storage position, illustrated in phantom at 27 in FIG. 1, where the lever is parallel to the cookie barrel 12. As such, the lever is easy to pivot between the storage position and the use position.

As illustrated in FIG. 3, a rod 32 and advancing plunger 40 are positioned within the barrel 12 of the manual cookie press. The rod 32 extends a length greater than that of the cookie barrel 12. The rod includes a number of teeth 34 that are aligned along one side. The remainder of the rod has a smooth surface. One end of the rod is disposed within an opening at the center of the knob 36. The opposite end of the rod is disposed within an opening at the center of a plunger 40. A washer 38 is placed on the rod before it is connected to the plunger 40. The washer is placed at the connection between the rod and the plunger to distribute the force exerted on the rod across the plunger when the lever is depressed. The plunger 40 extends approximately the complete cross-sectional area of the cookie barrel 12 but is sized so that it is capable of sliding in a vertical direction within the cookie barrel. Additionally, the plunger 40 is sized to lightly contact the inner surface of the cookie barrel, so that it is able to completely engage all of the cookie dough placed within the barrel.

As shown in FIG. 3, the cookie press includes an advancing mechanism, indicated at 29, positioned on the top end of the barrel. The advancing mechanism 29 includes a main housing 30 is cylindrical and includes a centrally located opening 31 therethrough. The main housing 30 that is sized so that it may be positioned over the top end of the cookie barrel 12. The top cap 14, which is also part of the advancing mechanism 29, is placed over the main housing 30 such that the opening 15 in the top cap 16 is concentrically aligned with the opening 31 in the housing 30. The advancing mechanism also includes an escapement assembly 50 that advances the rod 32 and plunger 40 in the barrel. The advancing mechanism also includes a lockout assembly 68. As will be explained below, the lockout assembly aids the advancing mechanism by restraining the rod from upward movement when the lever 22 is raised.

As illustrated in FIG. 3, the escapement assembly 50 and the lockout assembly 68 are positioned within the main housing 30 of the advancing mechanism. More specifically, the escapement assembly is positioned within the opening 31 of the main housing 30 such that it extends through the opening 31. The lockout assembly 68 is positioned below the escapement assembly 50 slightly above the top of the cookie barrel 12.

Figure 6:
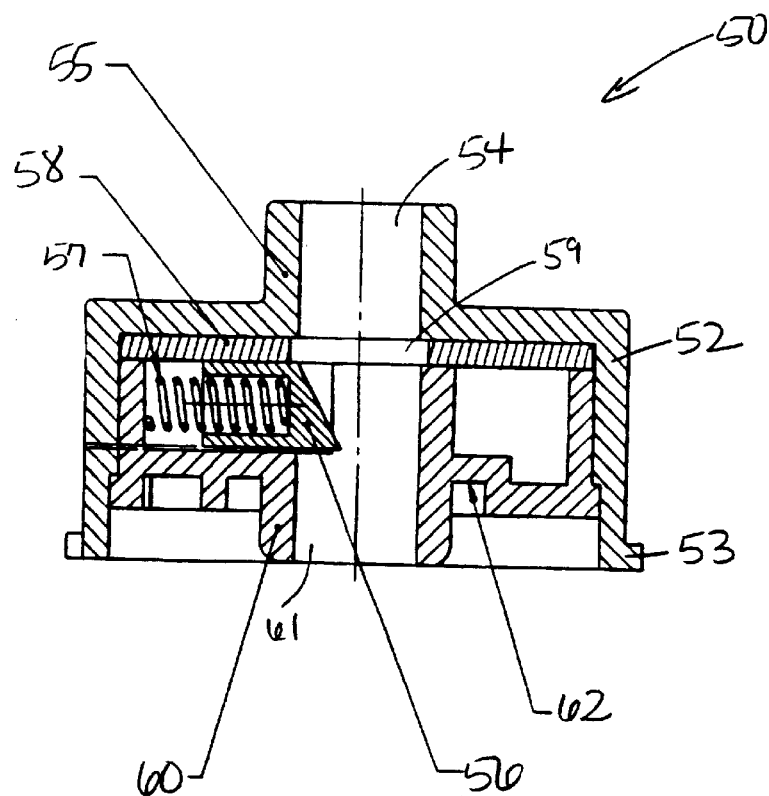
FIG. 6 is a cross sectional view of the escapement assembly illustrated in FIG. 5 taken along line 6—6.
Figure 5:
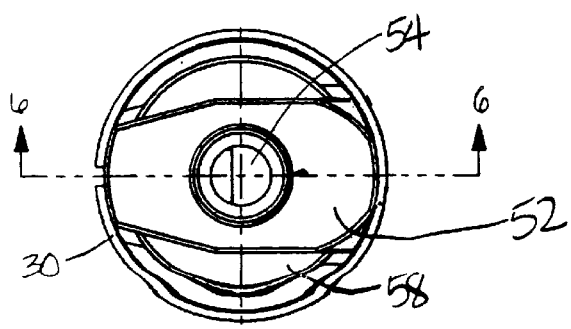
FIG. 5 is a top plan view of the escapement assembly positioned in the manual cookie press illustrated in FIG. 1.

The advancing mechanism 29 is illustrated in greater detail in FIG. 4, a top view is illustrated in FIG. 5 and an enlarged view of the escapement assembly, by itself, is illustrated in FIG. 6. As shown in FIG. 6, the escapement assembly 50 includes an escapement body 52, a driver 56, a spring 57, a drive washer 58 and an escapement cap 60. The escapement body 52 houses the washer 58, the escapement cap 60, the driver 56 and the spring 57. The escapement body 52 is a cylindrical member with an upwardly extending neck 55 and an open underside. An opening 54 extends through the center of the neck 55 of the escapement body 52. As shown in FIG. 4, the rod 32 extends through the neck 55 of the escapement body so that it may be positioned at the center of the escapement body 52. The escapement body 52 also includes a flange 53 that extends outwardly from the bottom portion of the escapement body 52. As illustrated in FIG. 4, the flange 53 prevents the escapement body from being removed from the top of the housing of the assembled cookie press. More specifically, once the flange 53 contacts the main housing 30, it restrains the escapement body 52 from traveling upward.

As shown in FIGS. 5 and 6, the drive washer 58 is a circular disc with a circular central opening 59 therethrough. The drive washer is positioned adjacent to the underside of the escapement body 52 to relieve friction that might occur between the escapement body 52 and the spring biased driver 56. As illustrated in FIG. 5, the top of the escapement body 52 only covers a portion of the washer 58 so that the arcuate outer portions of the washer remain exposed. When the cookie press is used, the exposed portions of the washer 58 are contacted by the protrusions 26 that extend downwardly from the lever 22 (see FIG. 1).

As illustrated in FIG. 6, the driver 56, spring 57 and escapement cap 60 are positioned below the washer 58. The driver 56 is generally box-shaped with one end being open to house the spring 57 and the opposite end being angled to matingly engage the teeth 34 in the rod 32 (FIG. 3). The spring 57 is disposed within the driver 56. As a result, the spring biases the driver 56 so that it may slide towards the opening 61 to engage the teeth on the rod that is positioned within the opening 61. The escapement cap 60 abuts the driver 56 such that the driver 56 is positioned between the drive washer 58 and the escapement cap 60. The escapement cap 60 includes an opening 61 located at the center of the escapement cap 60 and extending through the escapement cap 60. The underside of the cap includes spaced cavities 62 that act as a seat for compression spring 64 (FIG. 4). Compression spring 64 is positioned below the escapement assembly. The compression spring 64 urges the escapement assembly upwards when the lever releases the escapement body.

As illustrated in FIG. 6, the circular openings 54, 59 and 61 located through the center of the escapement body 52, the drive washer 58 and the escapement cap 60, respectively, are concentrically aligned. Each opening is sized to receive and house the circular rod 32 (FIG. 3) of the cookie press. As a result, the circular rod 32 is positioned at the center of the cookie barrel 12, as illustrated in FIG. 3.

As illustrated in FIG. 4, the lockout assembly, indicated in general at 68, includes a lockout housing 70, a lockout 72, a lockout spring 74 and a lockout cover 76. The lockout housing 70 includes spaced cavities 79 that act as a seat for compression spring 64. The spaced cavities 79 of the lockout housing 70 are aligned with the spaced cavities 62 in the escapement cap 60. As shown in FIG. 4, the compression spring is disposed around the rod with one end of the compression spring 64 housed in the spaced cavities 62 of the escapement cap 60 while the other end of the spring is housed in the spaced cavities 79 of the lockout housing 70. The lockout housing 70 also includes a circular opening 71 through the center. The opening 71 is sized to receive the rod 32.

The lockout 72 is an "L-shaped" tab with a vertical portion and a horizontal portion. The vertical portion engages spring 74 and a rectangular opening 73 extends through the horizontal portion. The opening 73 is also sized to receive the rod 32. The lockout 72 is biased by spring 74 so that it engages the teeth 34 of the rod 32 to prevent the rod 32 from sliding upwards. As the rod moves downward, however, the lockout 72 is moved horizontally against the force exerted by spring 74 so that it travels over the next highest tooth in the rod. The lockout cover 76 includes an opening 77 through the center of the lockout cover 76. The opening 77 is also sized to receive the rod 32. The lockout cover is positioned under the lockout housing and circumferentially abuts the inner surface of the main housing 30 to prevent the components from being released from the cookie press.

The openings 71, 73 and 77 of the lockout assembly are aligned with the openings in the escapement assembly 50 so that the rod remains centered within the cookie barrel. As a result, the openings define a path for the rod to travel as it advances the cookie dough.

Figure 7:
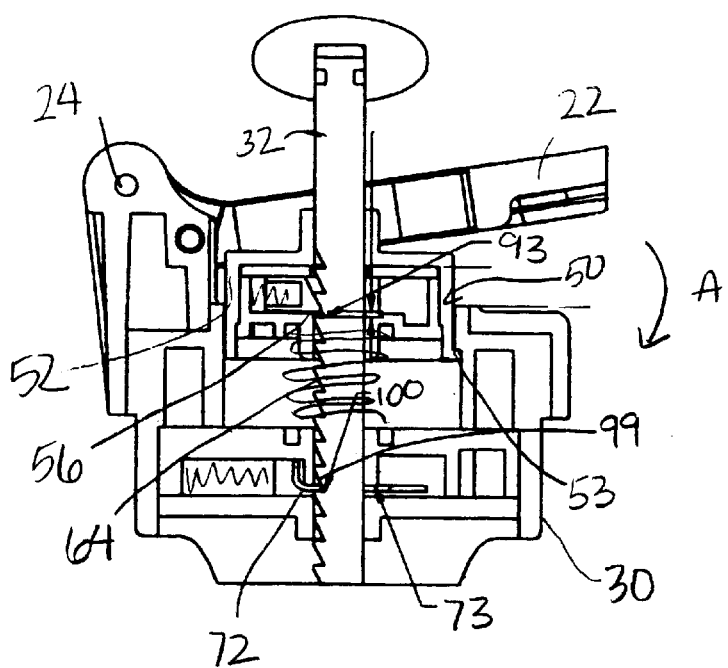
FIG. 7 is a cross sectional view of the manual cookie press of FIG. 3 where the lever is placed in a ready position.
Figure 8:
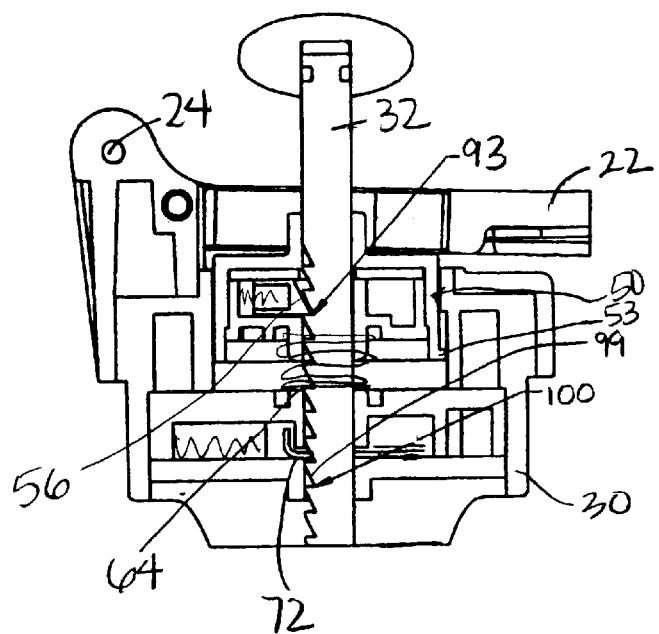
FIG. 8 is a cross sectional view of the manual cookie press of FIG. 7 where the lever is fully depressed and the rod has been advanced.

FIGS. 7–9 illustrate the various positions of the lever 22, the rod 32, the driver 56 and the lockout 72 during one complete cycle that the lever of the cookie press travels to dispense a cookie. To prepare the cookie press for use, the knob and the connected rod are lowered to allow the lever to rotate over the knob 36 and the rod 32. Next, the lever 22 is placed in a use position perpendicular to the cookie barrel, as illustrated in FIG. 7. The rod 32 is temporarily rotated such that the teeth 34 face away from the hinge 24 and the driver 56. This enables the rod 32 to be manually raised with respect to the cookie barrel 12 and escapement assembly 50 via the knob 36. The rod 32 is then rotated so that the teeth 34 are positioned facing the hinge 24 and in engagement with the driver 56.

To prepare the cookie press for use, with reference to FIGS. 1 and 3, the bottom cap 16, any stored discs and the disc tube 18 are removed and the consumer fills the barrel with cookie dough. After the barrel is filled with cookie dough, the consumer places the desired disc and bottom cap onto the cookie barrel.

As illustrated in FIG. 7, the cookie press is ready to press the cookie dough. More specifically, the lever 22 is in the use position and the rod 32 has been rotated so that the driver 56 and lockout 72 engage the teeth 34 of the rod 32. The escapement assembly 50 is positioned at its upward most position wherein the flange 53 of the escapement body 52 engages the main housing 30 and the driver 56 engages one of the teeth 34, for example tooth 93, on the rod 32.

Since the escapement assembly 50 is in a raised position, the lever 22 is able to engage the washer 58 positioned under the escapement body 52 of the escapement assembly as it is depressed. As the lever 22 is depressed, that is, moved in the direction of arrow A, it pushes the washer 58 and the remainder of the escapement assembly downwards towards the cookie barrel 12. As the escapement assembly moves downwards, spring 64 is compressed and the spring biased driver 56 forces the rod 32 downwards. With reference to FIG. 3, as the rod 32 lowers, the plunger pushes the cookie dough out of the barrel 12 through the openings 21 in the disc 20 thereby forming a cookie.

Additionally, as the rod 32 lowers, the lockout 72 compresses the spring 74 as it travels over the next highest tooth 99. FIG. 8 illustrates the lever 22 at the bottom of its stroke. At this point, lockout 72 has traveled over and is now engaging tooth 99. In addition, spring 64 has been fully compressed.

As illustrated in FIG. 9, as the lever 22 is released, the spring 64 begins to expand. As the spring 64 expands, the escapement assembly 50 is forced upwards, in the direction of arrow B, away from the cookie barrel 12. As the escapement assembly 50 is forced upwards by spring 64, the driver 56 travels over the next highest tooth thereby compressing spring 57. Since the lockout 72 already engages the tooth 99 on the rod 32, the rod 32 is restrained from raising along with the escapement assembly 50 and the lever 22. Thus, the lockout 72 prohibits the rod 32 from raising when the lever 22 is raised between downward strokes.

The above process may continue until the plunger is lowered to the bottom of the barrel and all of the cookie dough has been dispensed. At this point the knob 36 would be nearly adjacent to the lever 22.

While the preferred embodiments of the invention have been shown and described, it will be apparent to those skilled in the art that changes and modifications may be made therein without departing from the spirit of the invention, the scope of which is defined by the appended claims.

I claim:

1. An apparatus for dispensing a food substance comprising:
    a) a housing;
    b) a barrel connected to the housing and adapted to receive the food substance;
    c) a plunger slidably positioned within the barrel;
    d) a rod having teeth thereon and connected to the plunger;
    e) an advancing mechanism movably positioned within the housing and including:
        i) an escapement body;
        ii) a driver slidably positioned within the escapement body;
        iii) a spring engaging the driver and the escapement body so that the driver is biased toward said rod so that the driver engages a tooth of said rod;
    f) a lever pivotally attached to the housing and engaging said advancing mechanism so that when said lever is pressed towards said barrel, the driver moves said rod so that said plunger is advanced to dispense the food substance from the barrel.

2. The apparatus of claim 1, wherein said lever pivots between a storage position where the lever is generally parallel to the barrel and a use position where the lever engages the advancing mechanism.

3. The apparatus of claim 1, wherein one end of the driver is angled to matingly engage the teeth in the rod.

4. The apparatus of claim 1, further comprising a compression spring positioned around the rod and below the advancing mechanism, wherein the compression spring is adapted to raise the advancing mechanism with respect to the housing.

5. The apparatus of claim 1, further comprising a bottom cap removably attached to the bottom of the barrel.

6. The apparatus of claim 5, further comprising a disc having openings that form a template disposed within the bottom cap.

7. The apparatus of claim 1, further comprising a lockout assembly disposed within the housing and positioned below the advancing mechanism.

8. The apparatus of claim 7, wherein the lockout assembly comprises a lockout housing, a tab disposed within the lockout housing and a spring that biases the tab so that the tab engages the teeth of the rod to prevent the rod from sliding upwards.

9. The apparatus of claim 8, wherein the tab has a vertical portion and a horizontal portion, the vertical portion being biased by the spring and the horizontal portion having an opening to receive the rod.

10. An apparatus for dispensing a food substance, said apparatus comprising:
 a) a housing;
 b) a barrel attached to the housing and adapted to receive the food substance;
 c) a plunger for engaging the food substance slidably positioned within the barrel;
 d) a rod having teeth attached to the plunger; and
 e) an advancing mechanism disposed within the housing, said advancing mechanism including:
  i) an escapement body disposed within the housing adapted to move vertically with respect to the housing;
  ii) a driver positioned in the escapement body such that the driver is adapted to move horizontally with respect to the housing; and
  iii) a spring biasing the driver towards the rod so that the driver engages the teeth on the rod and the rod is advanced when the escapement body is moved downwards.

11. The apparatus of claim 10, further comprising:
 a lever pivotally connected to the housing, wherein the lever is adapted to pivot from a storage position where the lever is parallel to the barrel to a use position where the lever engages the advancing mechanism.

12. The apparatus of claim 10, wherein one end of the driver is angled to matingly engage the teeth in the rod.

13. The apparatus of claim 10, further comprising a compression spring positioned around the rod and below the means for advancing, wherein the compression spring is adapted to raise the means for advancing with respect to the housing.

14. The apparatus of claim 10, further comprising a bottom cap removably attached to the bottom of the barrel.

15. The apparatus of claim 14, further comprising a disc having openings that form a template disposed within the bottom cap.

16. The apparatus of claim 10, further comprising a lockout assembly disposed within the housing and positioned below the advancing mechanism.

17. The apparatus of claim 16, wherein the lockout assembly comprises a lockout housing, a tab disposed within the lockout housing and a spring that biases the tab so that the tab engages the teeth of the rod to prevent the rod from sliding upwards.

18. The apparatus of claim 17, wherein the tab has a vertical portion and a horizontal portion, the vertical portion being biased by the spring and the horizontal portion having an opening to receive the rod.

\* \* \* \* \*